US010778745B2

(12) United States Patent
Jain

(10) Patent No.: US 10,778,745 B2
(45) Date of Patent: Sep. 15, 2020

(54) SYSTEMS AND METHODS FOR PROVIDING A PERSONALIZED VISUAL DISPLAY MULTIPLE PRODUCTS

(71) Applicant: Google Inc., Mountain View, CA (US)

(72) Inventor: Dinkar Jain, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 547 days.

(21) Appl. No.: 15/457,735

(22) Filed: Mar. 13, 2017

(65) Prior Publication Data
US 2017/0185251 A1 Jun. 29, 2017

Related U.S. Application Data

(63) Continuation of application No. 14/035,062, filed on Sep. 24, 2013, now abandoned.

(60) Provisional application No. 61/868,974, filed on Aug. 22, 2013.

(51) Int. Cl.
*G06Q 30/00* (2012.01)
*H04L 29/08* (2006.01)
*G06Q 30/06* (2012.01)
*G06F 3/0481* (2013.01)

(52) U.S. Cl.
CPC ............ *H04L 67/02* (2013.01); *G06F 3/0481* (2013.01); *G06Q 30/0631* (2013.01); *G06Q 30/0643* (2013.01)

(58) Field of Classification Search
CPC ............ G06Q 30/0631; G06Q 30/0643; G06F 3/0481; H04L 67/02
See application file for complete search history.

(56) References Cited

U.S. PATENT DOCUMENTS

| 7,353,246 | B1 * | 4/2008 | Rosen | G06F 16/9558 |
| | | | | 709/202 |
| 7,366,721 | B1 * | 4/2008 | Bennett | G06Q 30/02 |
| | | | | 711/206 |
| 7,660,822 | B1 * | 2/2010 | Pfleger | G06F 16/248 |
| | | | | 707/805 |

(Continued)

OTHER PUBLICATIONS

Jing, Yushi, and Shumeet Baluja. "Visualrank: Applying pagerank to large-scale image search." IEEE Transactions on Pattern Analysis and Machine Intelligence 30.11 (2008): 1877-1890. (Year: 2008).*

(Continued)

*Primary Examiner* — Matthew E Zimmerman
(74) *Attorney, Agent, or Firm* — Foley & Lardner LLP

(57) ABSTRACT

Systems and methods for providing a personalized visual display of multiple products are provided. A described method includes receiving product information for a set of multiple products and user information for a particular user or user device and selecting a plurality of the multiple products estimated to be most relevant to the particular user or user device based on the product information for the set of multiple products and the user information for the particular user or user device. The method further includes generating a personalized visual display of the selected products including product images for multiple of the selected products. All of the products in the personalized visual display may be associated with the same content provider. The method further includes causing the personalized visual display to be presented via the user device.

18 Claims, 6 Drawing Sheets

(56) References Cited

U.S. PATENT DOCUMENTS

| | | | | |
|---|---|---|---|---|
| 7,996,282 B1* | 8/2011 | Scott | ............ | G06Q 30/06 705/27.1 |
| 8,280,783 B1* | 10/2012 | Brownell | ............ | G06Q 30/00 705/26.1 |
| 8,560,398 B1* | 10/2013 | Gregov | ............ | G06Q 30/06 705/26.2 |
| 8,612,428 B2* | 12/2013 | Ito | ............ | G06F 16/58 707/727 |
| 2002/0055878 A1* | 5/2002 | Burton | ............ | G06Q 30/0625 705/27.2 |
| 2008/0034284 A1* | 2/2008 | Skicewicz | ............ | G06F 16/51 715/246 |
| 2008/0091546 A1* | 4/2008 | Kirovski | ............ | G06Q 30/0623 705/26.64 |
| 2009/0171813 A1* | 7/2009 | Byrne | ............ | G06Q 30/02 705/26.1 |
| 2009/0254455 A1* | 10/2009 | Rothey | ............ | G06Q 30/0601 705/26.1 |
| 2010/0205530 A1* | 8/2010 | Butin | ............ | G06F 9/453 715/715 |
| 2012/0191577 A1* | 7/2012 | Gonsalves | ............ | G06Q 30/06 705/27.2 |
| 2013/0054360 A1* | 2/2013 | Ross | ............ | G06Q 30/0639 705/14.53 |
| 2013/0268392 A1* | 10/2013 | Chateau-Artaud | ............ | G06Q 30/0641 705/26.7 |
| 2013/0311340 A1* | 11/2013 | Krishnan | ............ | G06Q 30/0633 705/27.2 |
| 2014/0052580 A1* | 2/2014 | Ali | ............ | G06F 3/016 705/26.61 |

OTHER PUBLICATIONS

Gloto, Engagement Ads for Web and Mobile. Retrieved Aug. 22, 2013. http://gloto.com/engagement-ads/ (3 pages).
Google Product Listing Ads. Retrieved Aug. 22, 2013. http://www.google.com/ads/innovations/productlistingads.html (2 pages).
Pinterest. Retrieved Aug. 22, 2013. https://pinterest.com/ (1 page).
US Office Action on U.S. Appl. No. 14/035,062 dated May 26, 2016 (7 pages).
US Office Action on U.S. Appl. No. 14/035,062 dated Oct. 1, 2015 (17 pages).

* cited by examiner

SYSTEMS AND METHODS FOR PROVIDING A PERSONALIZED VISUAL DISPLAY MULTIPLE PRODUCTS

RELATED APPLICATIONS

The present application claims the benefit of priority under 35 U.S.C. § 120 as a continuation of U.S. patent application Ser. No. 14/035,062 entitled "SYSTEMS AND METHODS FOR PROVIDING A PERSONALIZED VISUAL DISPLAY OF MULTIPLE PRODUCTS", filed on Aug. 24, 2013, which claims the benefit of priority under 35 U.S.C. § 119 from U.S. Provisional Patent Application Ser. No. 61/868,974 entitled "SYSTEMS AND METHODS FOR PROVIDING A PERSONALIZED VISUAL DISPLAY OF MULTIPLE PRODUCTS," filed on Aug. 22, 2013, the disclosures of each of which are hereby incorporated by reference in their entirety for all purposes.

BACKGROUND

In a computerized content delivery network, electronic content items are typically distributed from a content server to a user device. A content provider (e.g., an advertiser, a retailer, a business owner, etc.) may supply the content server with a variety of different content items relating to many different products or services offered by the content provider. The content server is typically responsible for selecting a particular content item to deliver to the user device (e.g., in response to a request for content from the user device). It is often difficult and challenging to predict which content item will be most effective (e.g., to induce a sale or other conversion) or most relevant for a particular user or user device.

SUMMARY

One implementation of the present disclosure is a method for generating a personalized visual display of multiple products. The method includes receiving, at a content server, product information for a set of multiple products and user information for a particular user or user device. The method further includes selecting, by the content server, a plurality of products from the set of multiple products according to product selection criteria. The product selection criteria includes criteria for selecting products which are most relevant to the particular user or user device based on the product information for the set of multiple products and the user information for the particular user or user device. The method further includes generating, by the content server, a personalized visual display of the selected products. The personalized visual display includes product images for multiple of the selected products. A plurality of the product images may be displayed concurrently in the personalized visual display. The method further includes causing the personalized visual display to be presented via the user device. In some implementations, all of the products in the set of multiple products are associated with a same content provider.

In some implementations, the method further includes causing detailed product information to be presented via the user device. The detailed product information may include at least one of: additional images, product specifications, price, availability, and purchasing information. In some implementations, the detailed product information is presented in response to an interaction with one of the product images in the personalized visual display.

In some implementations, generating the personalized visual display includes determining an arrangement for the personalized visual display and generating the personalized visual display according to the determined arrangement. The arrangement may include at least one of: image sizes and image positions for the images of the selected products. In some implementations, determining the arrangement for the personalized visual display includes identifying arrangement criteria comprising criteria for arranging the product images based on which of the selected products are most relevant to the particular user or user device based on the product information for the set of multiple products and the user information for the particular user or user device, and determining the arrangement according to the identified arrangement criteria. In some implementations, the personalized visual display has a fixed display size. Determining the arrangement for the personalized visual display may be based on the fixed display size.

In some implementations, the personalized visual display has a variable display size based on at least one of: a number of products in the set of multiple products, a number of products in the selected plurality of products, and a display size of the product images in the personalized visual display.

In some implementations, the personalized visual display has a first display size and is presented within a display unit having a second display size smaller than the first display size. The display unit may be configured to present a portion of the personalized visual display and to allow adjusting the portion of the personalized visual display visible in the display unit.

In some implementations, the method further includes delivering a content item to the user device and detecting an interaction with the delivered content item. At least one of: selecting the plurality of the multiple products, generating the personalized visual display, and causing the personalized display to be presented may be performed in response to detecting an interaction with the delivered content item. In some implementations, the delivered content item has a first display size and the personalized visual display has a second display size larger than the first display size.

In some implementations, the method further includes identifying a content provider associated with the delivered content item. All of the products in the set of multiple products may be associated with the identified content provider.

In some implementations, the personalized visual display includes one or more supplemental items displayed concurrently with the plurality of product images. In some implementations, the method further includes determining an arrangement of the one or more supplemental items and the plurality of product images for the personalized visual display. The personalized visual display may be generated according to the determined arrangement. In some implementations, the supplemental items include at least one of: text associated with one or more of the plurality of product images, a map, and a coupon.

Another implementation of the present disclosure is a system for generating a personalized visual display of multiple products. The system includes a communications interface configured to receive product information for a set of multiple products and user information for a particular user or user device and a processing circuit configured to select a plurality of products from the set of multiple products according to product selection criteria. The product selection criteria includes criteria for selecting products which are most relevant to the particular user or user device based on the product information for the set of multiple products and the user-specific information for the particular user or user device. The processing circuit is further configured to generate a personalized visual display of the selected products. The personalized visual display includes product images for multiple of the selected products. A plurality of the product images may be displayed concurrently in the personalized visual display. The processing circuit is further configured to cause the personalized visual display to be presented via the user device. In some implementations, all of the products in the set of multiple products are associated with a same content provider.

In some implementations, the processing circuit is further configured to cause detailed product information to be presented via the user device. The detailed product information may include at least one of: additional images, product specifications, price, availability, and purchasing information. In some implementations, the detailed product information is presented in response to an interaction with one of the product images in the personalized visual display.

In some implementations, generating the personalized visual display includes determining an arrangement for the personalized visual display and generating the personalized visual display according to the determined arrangement. The arrangement may include at least one of: image sizes and image positions for the images of the selected products. In some implementations, determining the arrangement for the personalized visual display includes identifying arrangement criteria comprising criteria for arranging the product images based on which of the selected products are most relevant to the particular user or user device based on the product information for the set of multiple products and the user information for the particular user or user device, and determining the arrangement according to the identified arrangement criteria. In some implementations, the personalized visual display has a fixed display size. Determining the arrangement for the personalized visual display may be based on the fixed display size.

In some implementations, the personalized visual display has a variable display size based on at least one of: a number of products in the set of multiple products, a number of products in the selected plurality of products, and a display size of the product images in the personalized visual display.

In some implementations, the personalized visual display has a first display size and is presented within a display unit having a second display size smaller than the first display size. The display unit may be configured to present a portion of the personalized visual display and to allow adjusting the portion of the personalized visual display visible in the display unit.

In some implementations, the processing circuit is further configured to deliver a content item to the user device and to detect an interaction with the delivered content item. At least one of: selecting the plurality of the multiple products, generating the personalized visual display, and causing the personalized display to be presented may be performed in response to detecting an interaction with the delivered content item. In some implementations, the delivered content item has a first display size and the personalized visual display has a second display size larger than the first display size.

In some implementations, the processing circuit is further configured to identify a content provider associated with the delivered content item. All of the products in the set of multiple products may be associated with the identified content provider.

In some implementations, the personalized visual display includes one or more supplemental items displayed concurrently with the plurality of product images. In some implementations, the processing circuit is further configured to determine an arrangement of the one or more supplemental items and the plurality of product images for the personalized visual display. The personalized visual display may be generated according to the determined arrangement. In some implementations, the supplemental items include at least one of: text associated with one or more of the plurality of product images, a map, and a coupon.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for providing a personalized visual display of multiple products are shown, according to several described implementations. Conventionally, electronic content items (e.g., advertisements, product images, etc.) have been presented individually in separate content slots or display units. The systems and methods described herein may be used to generate a visual display of multiple products (e.g., multiple product images, multiple images of different products, etc.) and to present the visual display to a user within a single display unit. In some implementations, the plurality of product images may all be images associated with a single content provider. The systems and methods of the present disclosure may be used to present a user with a portfolio of products (e.g., a collage, a mosaic, a catalog, etc.) offered by a content provider without knowing exactly which specific products will most interest the user. The portfolio of products presented in the visual display may be more effective than a traditional content item (e.g., a content item featuring a single product) in inducing a sale or other conversion event (e.g., a click, a page view, etc.).

The products featured in the portfolio of products may be personalized for a particular user. For example, the portfolio of products may include multiple products which are estimated to be most relevant or interesting to the particular user (e.g., products having the highest potential to induce a sale or conversion, etc.). Several inputs (e.g., user-specific information, contextual information, keyword information, etc.) may be used to automatically generate lists of products that are likely to be most relevant or interesting to the user. In some implementations, the arrangement of products featured in the visual display (e.g., display sizes, display positions, etc.) may also be personalized. The concurrent visual display of multiple products offered by a single content provider may allow the content provider to showcase a personalized portfolio of many of their products, thereby providing users with a visual shopping experience.

Figure 1:
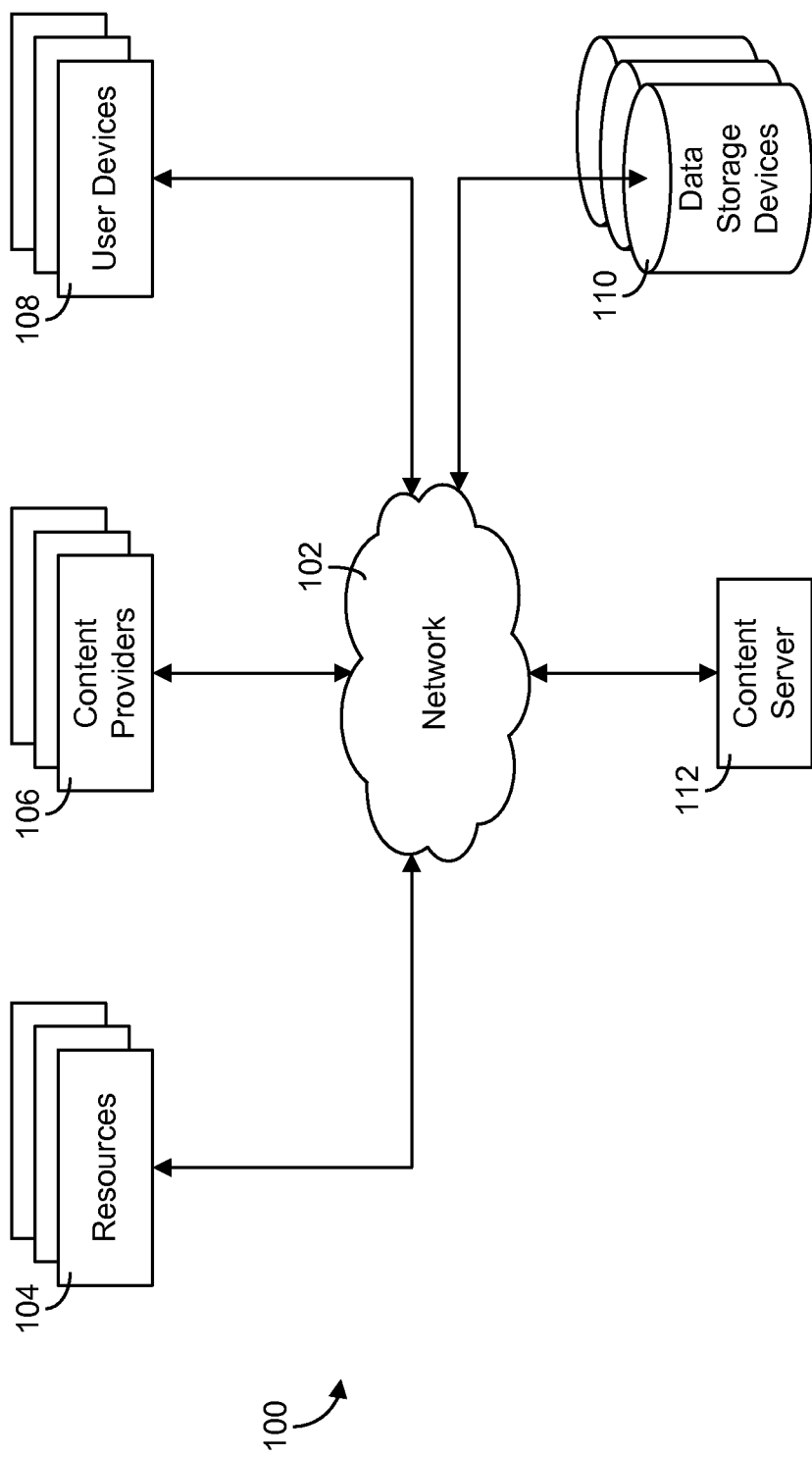
FIG. 1 is a block diagram of a computer system including a network, resources, content providers, user devices, data storage devices, and a content server, according to a described implementation.

Referring now to FIG. 1, a block diagram of a computer system 100 is shown, according to a described implementation. In brief overview, computer system 100 is shown to include a network 102, resources 104, content providers 106, user devices 108, data storage devices 110, and a content server 112. Computer system 100 may facilitate communication between resources 104, content providers 106, user devices 108, and content server 112. For example, user devices 108 may request and receive resource content (e.g., web pages, documents, etc.) from resources 104 via network 102. In some implementations, resources 104 may include content item slots for presenting third-party content items from content providers 106. Content server 112 may receive a request for a content item from user devices 108, select an eligible content item in response to the request, and distribute the content item to user devices 108 via network 102. The content item may be selected from a database of potential content items created or otherwise provided by content providers 106.

Still referring to FIG. 1, and in greater detail, computer system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, user devices 108 may communicate wirelessly (e.g., via WiFi, cellular, radio, etc.) with a transceiver that is hardwired (e.g., via a fiber optic cable, a CAT5 cable, etc.) to a computing device of network 102.

Still referring to FIG. 1, computer system 100 is shown to include resources 104. Resources 104 may include any type of information or data structure that can be provided over network 102. In some implementations, resources 104 may be identified by a resource address associated with each resource (e.g., a uniform resource locator (URL)). Resources 104 may include web pages (e.g., HTML web pages, PHP web pages, etc.), word processing documents, portable document format (PDF) documents, images, video, programming elements, interactive content, streaming video/audio sources, or other types of electronic information. Resources 104 may include content (e.g., words, phrases, images, sounds, etc.) having embedded information (e.g., meta-information embedded in hyperlinks) and/or embedded instructions. Embedded instructions may include computer-readable instructions (e.g., software code, JavaScript®, ECMAScript®, etc.) which are executed by user devices 108 (e.g., by a web browser running on user devices 108).

In some implementations, resources 104 may include content slots for presenting third-party content items. For example, resources 104 may include one or more inline frame elements (e.g., HTML "iframe" elements, <iframe> . . . </iframe>) for presenting third-party content items from content providers 106. An inline frame can be the "target" frame for links defined by other elements and can be selected by user agents (e.g., user devices 108, a web browser running on user devices 108, etc.) as the focus for printing, viewing its source, or other forms of user interaction. The content slots may cause user devices 108 to request third-party content items from content server 112 in response to viewing first-party resource content from resources 104.

Still referring to FIG. 1, computer system 100 is shown to include content providers 106. Content providers 106 may include one or more electronic devices representing advertisers, resource operators, business owners, or other entities using the services provided by content server 112. Content providers 106 may communicate product information for a set of multiple products to content server 112. The product information may include product images (e.g., thumbnail images, low/medium/high resolution product images, alternative product images, etc.), product details (e.g., product specifications, price, availability, descriptive text, purchasing information, etc.), and/or other information associated with the set or sets of multiple products.

In some implementations, the set of multiple products may include only products associated with a single content provider (e.g., offered for sale by the content provider, manufactured by the content provider, distributed by the content provider, promoted or advertised by the content provider, etc.). For example, if the content provider is an online retailer of computer electronics, each of the products in the set of products associated with the content provider may be a different item of computer electronics (e.g., a CPU, a motherboard, RAM, etc.) sold by the content provider. As another example, if the content provider is a clothing retailer, each of the products in the set of products associated with the content provider may be a different article of clothing (e.g., shirts, pants, sweaters, etc.) sold by the content provider. Each of content providers 106 may communicate product information associated with a different set of products to content server 112.

In some implementations, content providers 106 produce content items (e.g., an ad creative) for presentation to user devices 108. Content providers may submit multiple content items to content server 112 (e.g., via a data feed). In other implementations, content providers 106 submit a content generation request to content server 112 and content server 112 automatically generates content items in response to the request. The content items may be stored in one or more data storage devices local to content providers 106, within content server 112, or in data storage devices 110.

In some implementations, the content items are advertisements. The advertisements may be display advertisements such as image advertisements, Flash® advertisements, video advertisements, text-based advertisements, or any combination thereof. In other implementations, the content items include other types of content which serve various non-advertising purposes. The content items may be displayed in a content slot of resources 104 and presented (e.g., alongside other resource content) to user devices 108.

In some implementations, content providers 106 submit campaign parameters to content server 112. The campaign parameters may be used to control the distribution of content items to user devices 108. The campaign parameters may include keywords associated with the content items, bids corresponding to the keywords, a content distribution budget, geographic limiters, or other criteria used by content server 112 to determine when a content item may be presented to user devices 108.

Content providers 106 may access content server 112 to monitor the performance of the content items distributed according to the established campaign parameters. For example, content providers 106 may access content server 112 to review one or more behavior metrics associated with a content item or set of content items. The behavior metrics may describe the interactions between user devices 108 with respect to a distributed content item or set of content items (e.g., number of impressions, number of clicks, number of conversions, an amount spent, etc.).

Still referring to FIG. 1, computer system 100 is shown to include user devices 108. User devices 108 may include any number and/or type of user-operable electronic devices. For example, user devices 108 may include desktop computers, laptop computers, smart phones, tablets, mobile communication devices, remote workstations, client terminals, entertainment consoles, or any other devices capable of interacting with the other components of computer system 100 (e.g., via a communications interface). For example, user devices 108 may be capable of receiving resource content from resources 104 and/or third-party content items from content providers 106 or content server 112. User devices 108 may include mobile devices or non-mobile devices.

In some implementations, user devices 108 include an application (e.g., a web browser, a resource renderer, etc.) for converting electronic content into a user-comprehensible format (e.g., visual, aural, graphical, etc.). User devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). User devices 108 may function as a user agent for allowing a user to view HTML encoded content. User devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

In some implementations, user devices 108 may be capable of detecting an interaction with a distributed content item. An interaction with a content item may include displaying the content item, hovering over the content item, clicking on the content item, viewing source information for the content item, or any other type of interaction between user devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106, or by content server 112.

User devices 108 may be configured to execute computer-readable instructions (e.g., software code, Javascript®, ECMAScript®, etc.) in response to a detected interaction with a content item. The computer-readable instructions may be included in a distributed content item or otherwise provided to user devices 108. In some implementations, the computer-readable instructions cause user devices 108 to present a personalized visual display in response to a detected interaction with a content item. The personalized visual display may include multiple product images associated with a single content provider 106. The multiple product images may be arranged in a collage, mosaic, or other visual presentation format such that multiple products may be presented concurrently to user devices 108. The computer-readable instructions may further cause user devices 108 to present detailed product information for a particular product (e.g., product specifications, availability, price, additional or alternate product images, purchasing information, etc.) in response to a detected interaction with the associated product image (e.g., the product image associated with the particular product) in the personalized visual display.

Still referring to FIG. 1, computer system 100 is shown to include data storage devices 110. Data storage devices 110 may be any type of memory device capable of storing profile data, content item data, accounting data, or any other type of data used by content server 112. Data storage devices 110 may include any type of non-volatile memory, media, or memory devices. For example, data storage devices 110 may include semiconductor memory devices (e.g., EPROM, EEPROM, flash memory devices, etc.) magnetic disks (e.g., internal hard disks, removable disks, etc.), magneto-optical disks, and/or CD-ROM and DVD-ROM disks. In some implementations, data storage devices 110 may be local to content server 112, or content providers 106. In other implementations, data storage devices 110 may be remote data storage devices connected with content server 112 via network 102.

Data storage devices 110 may store product information associated with a set of multiple products. The product information may include product images (e.g., thumbnail images, low/medium/high resolution product images, alternative product images, etc.), product details (e.g., product specifications, price, availability, descriptive text, purchasing information, etc.), and/or other information associated with the set of multiple products. In some implementations, the set of multiple products may include only products associated with a single content provider. In some implementations, the product information may be received (e.g., via a data feed) from content providers 106 and/or content server 112.

Data storage devices 110 may store user information associated with user devices 108. User information may include, for example, user-specific information (e.g., user demographics, user preferences, user behavior data, user profile data, etc.), contextual information (e.g., user location, web page context, recent page views, etc.), keyword information (e.g., keywords associated with a particular web page or search query, etc.), and/or other information which may be used to select products which are relevant or interesting to a particular user or user device.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content server 114) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 108, etc.) and used by content server 112.

In some implementations, data storage devices 110 may be part of a data storage server or system capable of receiving and responding to requests from content server 112. For example, data storage devices 110 may receive requests for product information or user information from content server 112 and provide the requested information to content server 112.

Still referring to FIG. 1, computer system 100 is shown to include a content server 112. Content server 112 may receive product information for a set of multiple products from content providers 106 and/or data storage devices 110. In some implementations, the set of multiple products may include products associated with a only single content provider. Content server 112 may select a plurality of the multiple products for inclusion in a personalized visual display. In some implementations, content server 112 selects a plurality of the multiple products that are estimated to be most relevant or interesting to a particular user or user device (e.g., the user device on which the personalized visual display is to be presented). The selected products may be the products that are estimated to be most likely to invoke a purchase, a conversion event, or other desirable interaction (e.g., a commercial interaction) by the user device.

Content server 112 may generate the personalized visual display (e.g., display data representing the personalized visual display) and cause the personalized visual display to be presented via the particular user device. The personalized visual display may include multiple product images (e.g., a plurality of product images associated with a plurality of the selected products) which are presented concurrently via the user device. The concurrent presentation of multiple products (e.g., multiple products offered by a single content provider) may allow content providers 106 to showcase a personalized portfolio of many of their products, thereby providing users with a visual shopping experience. The portfolio of products presented in the visual display may be more effective than a traditional content item (e.g., a content item featuring a single product) in inducing a sale or other conversion event (e.g., a click, a page view, etc.) from user devices 108. Content server 112 is described in greater detail with reference to FIG. 2.

Figure 2:
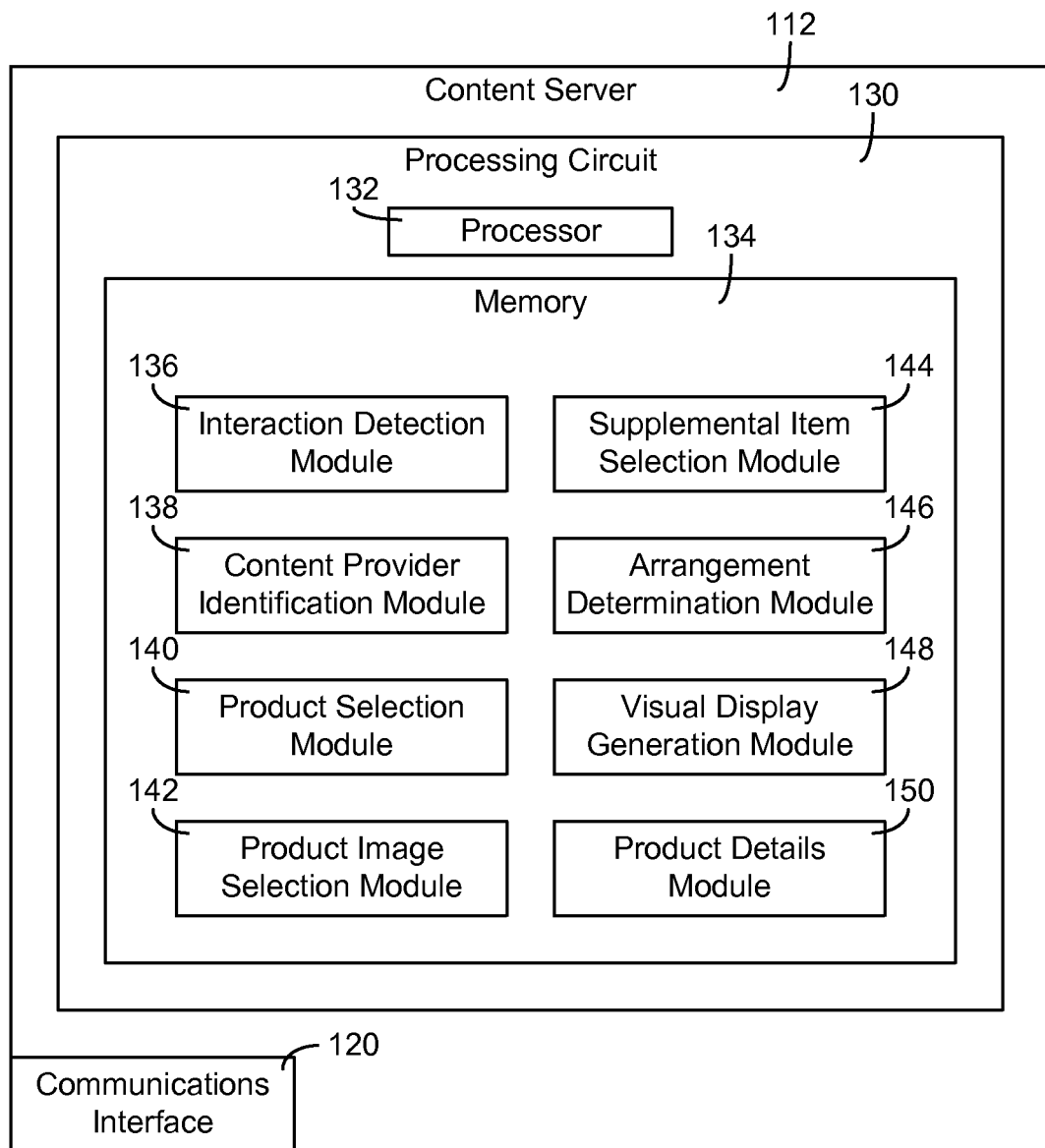
FIG. 2 is a block diagram illustrating the content server of FIG. 1 in greater detail, according to a described implementation.

Referring now to FIG. 2, a detailed block diagram of content server 112 is shown, according to a described implementation. Content server 112 is shown to include a communications interface 120 and a processing circuit 130. Communications interface 120 may include wired or wireless interfaces (e.g., jacks, antennas, transmitters, receivers, transceivers, wire terminals, Ethernet ports, WiFi transceivers, etc.) for conducting data communications with local or remote devices or systems. Communications interface 120 may allow content server 112 to communicate with network 102, resources 104, content providers 106, user devices 108, and data storage devices 110. For example, communications interface 120 may allow content server to receive product information and/or user information.

Communications interface 120 may be configured to receive product information from content providers 106 and/or data storage devices 110. Product information may include, for example, product images (e.g., thumbnail images, low/medium/high resolution product images, alternative product images, etc.), product details (e.g., product specifications, price, availability, descriptive text, purchasing information, etc.), and/or other information associated with a set of multiple products. In some implementations, the set of multiple products may include only products associated with a single content provider.

Communications interface 120 may be configured to receive user information from user devices 108 and/or data storage devices 110. User information may include, for example, user-specific information (e.g., user demographics, user preferences, user behavior data, etc.), contextual information (e.g., user location, web page context, recent page views, etc.), keyword information (e.g., keywords associated with a particular web page or search query, etc.), and/or other information which may be used by content server 112 to select products which are relevant or interesting to a particular user or user device (e.g., products which are most likely to invoke a purchase or conversion event). The product information and user information may be stored locally (e.g., within memory 134) or remotely (e.g., within data storage devices 110, etc.).

Still referring to FIG. 2, processing circuit 130 is shown to include a processor 132 and memory 134. Processor 132 may be implemented as a general purpose processor, an application specific integrated circuit (ASIC), one or more field programmable gate arrays (FPGAs), a CPU, a GPU, a group of processing components, or other suitable electronic processing components.

Memory 134 may include one or more devices (e.g., RAM, ROM, flash memory, hard disk storage, etc.) for storing data and/or computer code for completing and/or facilitating the various processes, layers, and modules described in the present disclosure. Memory 134 may comprise volatile memory or non-volatile memory. Memory 134 may include database components, object code components, script components, or any other type of information structure for supporting the various activities and information structures described in the present disclosure. In some implementations, memory 134 is communicably connected to processor 132 via processing circuit 130 and includes computer code (e.g., data modules stored in memory 134) for executing one or more processes described herein. In brief overview, memory 134 is shown to include an interaction detection module 136, a content provider identification module 138, a product selection module 140, a product image selection module 142, a supplemental item selection module 144, an arrangement determination module 146, a visual display generation module 148, and a product details module 150.

Still referring to FIG. 2, and in greater detail, memory 134 is shown to include an interaction detection module 136. Interaction detection module 136 may be configured to detect an interaction (e.g., by user devices 108) with a previously-delivered content item. The previously-delivered content item may be a content item that was previously delivered (e.g., from content server 112 or another content server) to user devices 108. The previously-delivered content item may be associated with a particular content provider.

An interaction with a content item may include displaying the content item, hovering over the content item, clicking on the content item, viewing source information for the content item, or any other type of interaction between user devices 108 and the content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106, or by content server 112.

Detecting an interaction with a previously-delivered content item may include receiving a detection notification from user devices 108. For example, user devices 108 may be configured to detect an interaction with a previously-delivered content item and report such interactions to content server 112. The interaction between user devices 108 and the previously-delivered content item may be detected by user devices 108, content server 112, and/or a separate server (e.g., an accounting server, a redirect server, etc.) configured to receive indications of interactions between user devices 108 and previously-delivered content items (e.g., redirect requests, ping requests, etc.). Detection interaction module 136 may be configured to receive indications of interactions between user devices 108 and previously-delivered content items and detect an interaction based on the interaction indications. In some implementations, an interaction between user devices 108 and a previously-delivered content item triggers additional processing steps performed by memory modules 138-150.

Still referring to FIG. 2, memory 134 is shown to include a content provider identification module 138. Content provider identification module 138 may be configured to identify a particular content provider to limit the scope of potential products which may be featured in the personalized visual display. For example, each of content providers 106 may be associated with a set of multiple products. In some implementations, each of the products featured in the personalized visual display is associated with the same content provider (e.g., of content providers 106). The content provider identified by content provider identification module 138 may define a set of products (e.g., products associated with the identified content provider) from which the products featured in the personalized visual display may be selected. Products associated with a particular content provider may include, for example, products that are offered for sale by the content provider, manufactured by the content provider, distributed by the content provider, promoted or advertised by the content provider, or otherwise associated or linked with the content provider. In some implementations, products may be associated with more than one content provider.

In some implementations, content provider identification module 138 identifies the content provider associated with the previously-delivered content item. The content provider associated with the previously-delivered content item may be identified using a content item ID or other information associated with the detected interaction. By identifying the content provider associated with the previously-delivered content item, content provider identification module 138 may ensure that the personalized visual display is linked to a content item with which the user device has already interacted. For example, if a user device interacts with a content item associated with a particular content provider, each of the products featured in the personalized visual display may also be associated with the particular content provider.

Still referring to FIG. 2, memory 134 is shown to include a product selection module 140. Product selection module 140 may be configured to select a plurality of products for inclusion in a personalized visual display. In some implementations, product selection module 140 selects the plurality of products in response to a detected interaction between user devices 108 and a previously-delivered content item (e.g., by interaction detection module 136 and/or user devices 108). In some implementations, product selection module 140 selects the plurality of products from a set of multiple products associated with a particular content provider (e.g., the content provider identified by content provider identification module 138).

Product selection module 140 may select the plurality of multiple products according to product selection criteria. In some implementations, the product selection criteria includes criteria for selecting products that are estimated to be most likely to invoke a purchase, a conversion event, a commercial interaction, or other desirable interaction by the user device (e.g., based on an established click-through-rate, a predicted click-through-rate, etc.). In some implementations, the product selection criteria includes criteria for selecting products that are most relevant (e.g., products that are estimated to be appealing, interesting, enticing, etc.) to a particular user or user device (e.g., of user devices 108).

In some implementations, product selection module 140 identifies products which are most relevant to a particular user or user device using information specific to the particular user or user device (i.e., "user-specific information"). User-specific information may include, for example, user demographics, user preferences, user behavior data, user profile data, user location data, user browsing history, device version/type data, browser version/type data, or other information relating to a particular user or user device.

In some implementations, product selection module 140 identifies products which are most relevant to a particular user or user device using information relating to the detected interaction. Information relating to the detected interaction may include, for example, information relating to a resource (e.g., of resources 104) in conjunction with which the previously-delivered content item was displayed (e.g., a URL of the particular resource having the content slot in which the previously-delivered content item was displayed, keywords associated with the particular resource, etc.). If the content slot is located on a search results page, information relating to the detected interaction may include keywords associated with the search query that led to the search results page.

Product selection module 140 may identify products which are most relevant to a particular user or user device by comparing keywords associated with each of the products in the set of multiple products with keywords associated with the particular user or user device and/or with keywords associated with the detected interaction. Keywords associated with each of the products in the set of multiple products may be specified by content providers 106, extracted from the product information, or otherwise identified using information associated with each of the multiple products. Keywords associated with the particular user or user device may be identified (e.g., generated, extracted, determined, etc.) using the user-specific information. Keywords associated with the detected interaction may be identified using the information relating to the detected interaction.

In some implementations, product selection module 140 outputs a list or other indication of a subset of the multiple products associated with the identified content provider (e.g., the content provider identified by content provider identification module 138). The subset may include less than all of the multiple products and may define a selection of the multiple products that will be included in the visual display.

For example, product selection module 140 may select a predetermined number of products (e.g., five products, ten products, fifty products, etc.). The predetermined number may be a static threshold, a dynamic threshold (e.g., based on the display sizes and/or available display space in the display unit), a user-adjustable threshold, or an automatically-adjusted threshold (e.g., based on a signal or parameter received from another memory module within memory 134 or from a separate device or system).

In some implementations, product selection module 140 outputs a ranking of the multiple products. The ranking may include some or all of the multiple products and may define a priority for including each of the products in the personalized visual display. For example, the top ranking product may have the highest priority for inclusion in the personalized visual display whereas the lowest ranking product may have the lowest priority for inclusion in the personalized visual display. The product rankings may be based on a relevancy score or other score assigned to the various products in determining which of the products are most likely to appeal to the particular user or user device. Product selection module 140 may select a predetermined number of the top ranking products or output the rankings for subsequent utilization by other memory modules of content server 112.

Still referring to FIG. 2, memory 134 is shown to include a product image selection module 142. In some implementations, one or more of the plurality of products may be associated with multiple product images. The multiple product images may include, for example, images of the product having various resolutions or image sizes (e.g., a high resolution image, a medium resolution image, a low resolution image, etc.), images of the product from different perspectives (e.g., a front perspective image, a rear perspective image, etc.), images of the product in different settings or uses, different versions of the product (e.g., different colors, different sizes, different model numbers, etc.), or other images of the product. Product image selection module 142 may be configured to select a product image for each of the plurality of products selected by product selection module 140. The product images selected by product image selection module 142 may be the product images included in the personalized visual display.

In some implementations, product image selection module 142 selects product images based on the product rankings assigned by product selection module 140. For example, product image selection module 142 may select a relatively larger image (e.g., having a larger display size) for a product with a relatively inclusion priority or relevancy score and may select a relatively smaller image (e.g., having a smaller display size) for a product with a relatively lower inclusion priority or relevancy score.

In some implementations, the product images selected by product image selection module 142 may be based on user-specific information (e.g., information specific to the particular user or user device) and/or information relating to the detected interaction. For example, product image selection module 142 may select images which are most relevant or estimated to be most appealing to a particular user (e.g., based on established user preferences or other user-specific information). In some implementations, product image selection module 142 selects exactly one image of each selected product for inclusion in the personalized visual display. In other implementations, product image selection module 142 selects two or more images for each selected product.

Still referring to FIG. 2, memory 134 is shown to include a supplemental item selection module 144. Supplemental item selection module 144 may be configured to select one or more supplemental items to include in the personalized visual display. The supplemental items may include, for example, descriptive text (e.g., text describing one or more of the product images selected by product image selection module 142), call to action text ("click here for more information," "buy now," etc.), information relating to special promotions or sales offers (e.g., "15% off everything with promo code ABC"), product coupons, store location information (e.g., a map illustrating the location of a nearby store), store contact information (e.g., telephone numbers, website URL, email address, etc.), or other types of information supplementing the plurality of product images selected by product selection module 142. The supplemental items may be included in the personalized visual display along with the plurality of product images.

Still referring to FIG. 2, memory 134 is shown to include an arrangement determination module 146. Arrangement determination module 146 may generate an arrangement which uses some or all of the product images selected by product image selection module 142. In some implementations, arrangement determination module 146 generates an arrangement that uses one or more of the supplemental items selected by supplemental item selection module 144. Determining an arrangement may include determining a display size and/or a display position for the selected images and supplemental items in the personalized visual display.

In some implementations, arrangement determination module 146 is configured to determine an arrangement that fills the display space available in a display unit (e.g., if the personalized visual display is presented in a fixed-size display unit). Arrangement determination module 146 may resize, crop, add a border or padding, stretch, shrink, or otherwise adjust one or more of the plurality of product images and supplemental items to achieve a particular display size. In other implementations, arrangement determination module 146 is configured to determine an arrangement without considering horizontal space limitations or vertical space limitations. For example, the personalized visual display may be scrolled (e.g., vertically, horizontally, etc.) to allow any number of product images and/or supplemental items to be presented, regardless of the display size of the display unit.

In some implementations, arrangement determination module 146 may personalize the display sizes and/or display positions of the selected images and supplemental items to a particular user or user device. For example, arrangement determination module 146 may assign a larger display size or more prominent display position in the personalized visual display (e.g., top, middle, etc.) to product images corresponding to products that are estimated to be more relevant or more appealing to the particular user to whom the personalized visual display will be presented. For example, if the personalized visual display will be presented to a user having a strong established interest in solid state hard drives, a product image of a solid state hard drive (if available in the set of products associated with the identified content provider) may be assigned a larger display size or more prominent display position than images of other products in the personalized visual display. Arrangement determination module 146 may use the product rankings and/or relevancy scores assigned by product selection module 140 (e.g., rankings/scores based on user-specific information and/or information relating to the detected interaction) to determine which of the plurality of product images and supplemental items to feature most prominently.

In some implementations, arrangement determination module 146 may determine an arrangement prior to product image selection module 142 selecting product images for each of the selected products. The images selected by product image selection module 142 may be based on the display size and/or display positions determined by arrangement determination module 146. For example, if arrangement determination module 146 determines that an image for a selected product should have a particular display size (e.g., 300 pixels by 200 pixels), product image selection module 142 may select a product image for the selected product having at least the particular display size such that stretching or padding is not required.

Still referring to FIG. 2, memory 134 is shown to include a visual display generation module 148. Visual display generation module 148 may be configured to generate a personalized visual display using some or all of the product images selected by product image selection module 142 according to the arrangement determined by arrangement determination module 146. In some implementations, generating the personalized visual display includes rendering the personalized visual display. In some implementations, generating the personalized visual display includes generating display data (e.g., rendering instructions) for transmission to user devices 108. User devices 108 may then render the personalized visual display using the display data generated by visual display generation module 148.

In some implementations, visual display generation module 148 generates the personalized visual display in response to an interaction between user devices 108 and a previously-delivered content item. The personalized visual display may be presented in the same window used to present the previously-delivered content item, in a modal window overlay, in a separate window or tab, or any other display location. An example of a personalized visual display which may be generated by visual display generation module 148 is described in greater detail with reference to FIG. 3.

Still referring to FIG. 2, memory 134 is shown to include a product details module 150. Product details module 150 may be configured to cause detailed product information to be presented via user devices 108. In some implementations, product details module 150 causes detailed product information to be presented via user devices 108 in response to an interaction with one of the product images in the personalized visual display (e.g., clicking on or hovering over the product image, etc.). Detailed product information may include, for example, additional images of the product, product specifications, price, availability, closely-related products, product alternatives (e.g., alternative sizes, colors, models, versions, etc.), product features, purchasing information, descriptive text, or any other type of information relating to a product presented in the personalized visual display.

In some implementations, product details module 150 causes the detailed product information to presented in a portion of the personalized visual display (e.g., the "product details portion"). The product details portion may be, for example, a modal window, a separate page or view, a separate window, or any other portion of the personalized visual display. Clicking on one of the product images in the personalized visual display may cause the personalized visual display to present additional details relating to the product associated with the clicked image. Product details module 150 may be configured to render the product details portion of the personalized visual display and/or to generate display data used to render the product details portion.

In some implementations, product details module 150 presents the detailed product information through a separate resource (e.g., a webpage owned or operated by content providers 106). Product details module 150 may embed a hyperlink into one or more of the product images in the personalized visual display. The hyperlink may cause user devices 108 to navigate to a resource through which the product associated with the image can be purchased or through which additional details of the associated product are displayed.

In some implementations, visual product details module 150 adds an overlay icon or text to one or more of the product images. The overlay icon or text (e.g., shown as a tag icon in FIG. 3) may include an embedded hyperlink different than the embedded hyperlink associated with the product images. For example, clicking a product image may cause additional details of the associated product to be displayed within the personalized visual display. Clicking an overlay icon may cause the user device to navigate to a webpage through which the product can be purchased.

In some implementations, the additional details of the associated product are displayed on the same webpage through which the product can be purchased. In other implementations, the additional product details are displayed in the product details portion of the personalized visual display. The product details portion may include a link to the webpage through which the product can be purchased. An example of a product details portion of the personalized visual display is described in greater detail with reference to FIG. 4.

Figure 3:
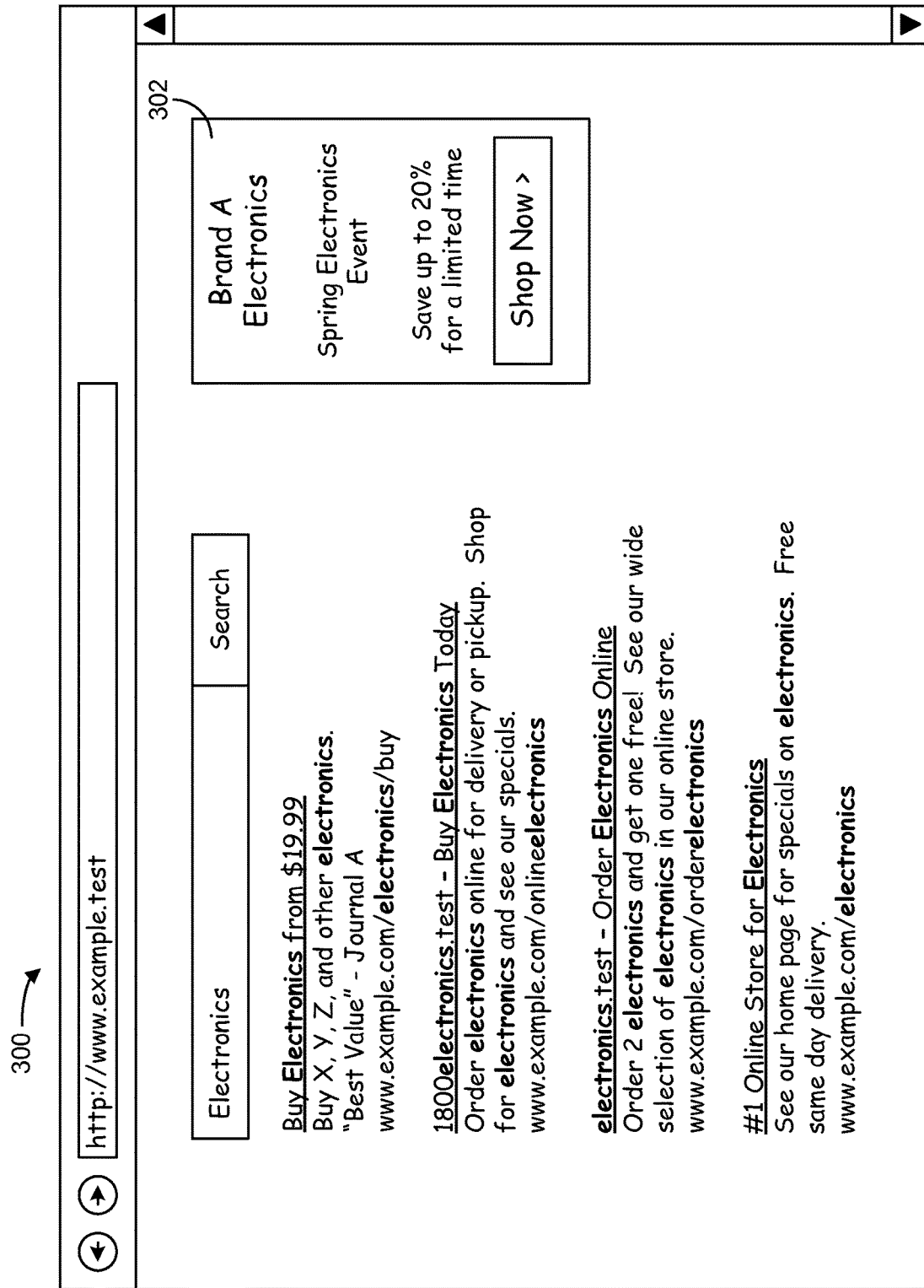
FIG. 3 is a drawing of a browser window including a content item that has been previously delivered to a user device, according to a described implementation.

Referring now to FIG. 3, a drawing of a browser window 300 is shown, according to a described implementation. Browser window 300 is shown to include a content item 302. In some implementations, content item 302 is an advertisement. Content item 302 may be a display advertisement, an image advertisement, a Flash® advertisement, a video advertisement, a text-based advertisement, or any combination thereof. In other implementations, content item 302 may include other types of content which serve various non-advertising purposes.

Content item 302 may be displayed in a content slot of an electronic resource (e.g., resources 104) and presented alongside other resource content to user devices 108. In some implementations, content item 302 may be presented in a content slot of a search results page in a web browser window (as shown in FIG. 3). In other implementations, content item 302 may be presented in any other type of electronic resource such as other types of web pages (e.g., HTML web pages, PHP web pages, non-search results web pages, etc.), word processing documents, portable document format (PDF) documents, images, video, programming elements, interactive content, streaming video/audio sources, or other types of electronic information.

Content item 302 may be presented in a browser window or in any other type of electronic resource (e.g., embedded into a word processing document, PDF document, video stream, etc.). In some implementations, content item 302 may be presented in a content slot. The content slot may cause user devices 108 to request third-party content items such as content item 302 from content server 112 when first-party resource content from the electronic resource is viewed, downloaded, rendered, or otherwise accessed.

Content item 302 may be associated with a particular content provider. For example, content item 302 may be associated with a content provider that operates an electronics store, a furniture store, a house cleaning service, a supermarket, a bank, an insurance company, or any other type of content provider. As shown in FIG. 3, content item 302 may be associated with a content provider that owns an electronics retail business.

Content item 302 may be a content item which was previously delivered to a user device. For example, content item 302 may have been delivered to user devices 108 (e.g., by content server 112 or another content server) in response to a request for content from user devices 108 (e.g., upon viewing an electronic resource having a content slot).

In some implementations, content item 302 includes computer-readable instructions (e.g., embedded software code, JavaScript®, ECMAScript®, etc.). The computer-readable instructions may cause user devices 108 to present a personalized visual display upon an interaction with content item 302. An interaction with content item 302 may include displaying content item 302, hovering over content item 302, clicking on content item 302, viewing source information for content item 302, or any other type of interaction between user devices 108 and content item 302. Interaction with a content item does not require explicit action by a user with respect to content item 302. In some implementations, an impression (e.g., displaying or presenting the content item) may qualify as an interaction.

Figure 4:
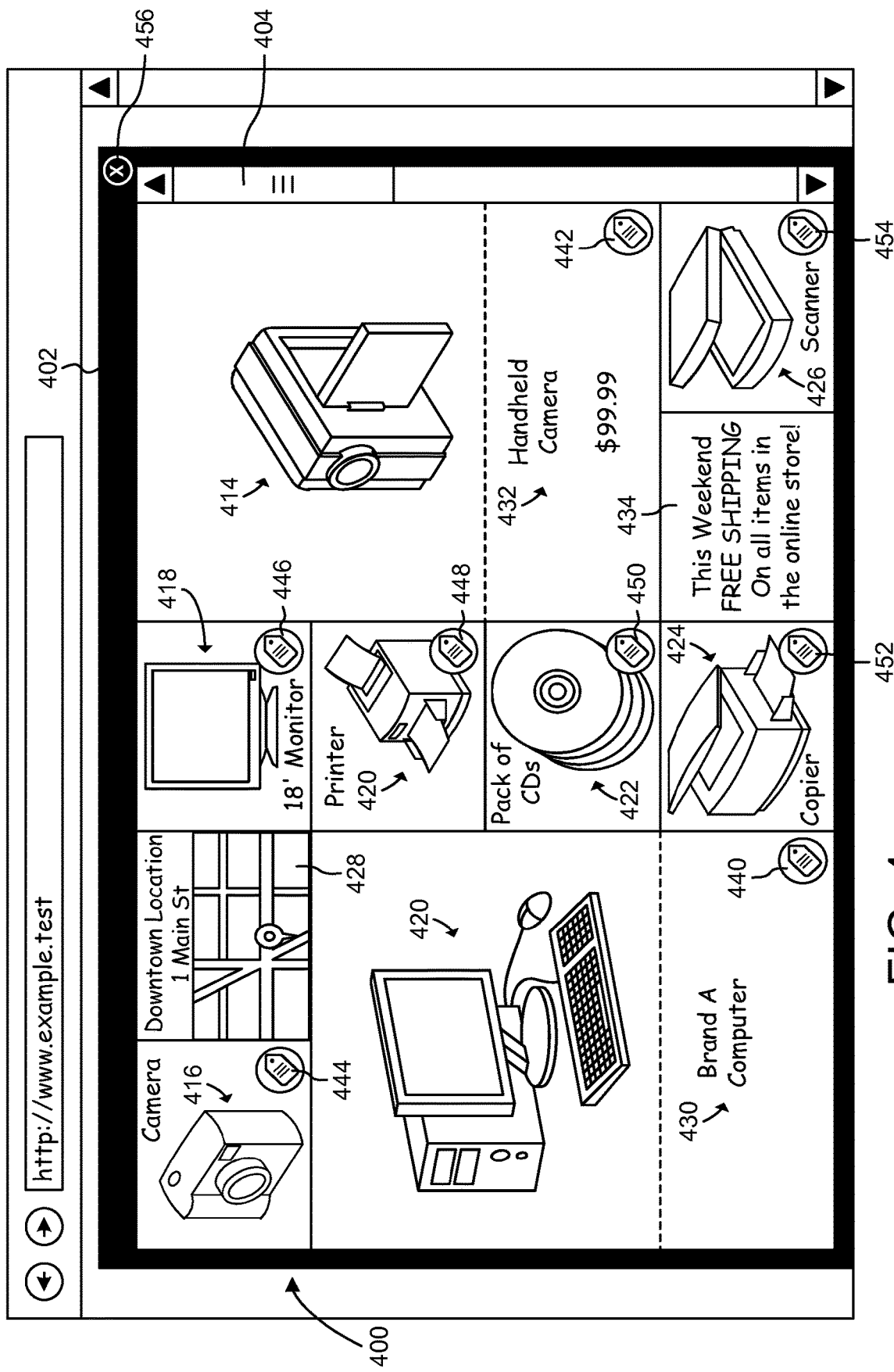
FIG. 4 is a drawing of a personalized visual display which may be presented in response to an interaction with the previously-delivered content item of FIG. 3, the personalized visual display including product images for personalized selection of products, according to a described implementation.

Referring now to FIG. 4, a drawing of a personalized visual display 400 is shown, according to a described implementation. Personalized visual display 400 may be presented in response to an interaction between user devices 108 and content item 302. In some implementations, personalized visual display 400 may be generated by visual display generation module 148, as described with reference to FIG. 2.

In some implementations, display 400 is presented in a display unit 402. Display unit 402 may be, for example, a modal window, a pop-up window, a browser window, a browser tab, or any other area or location in which personalized visual display 400 may be presented. In some implementations, personalized visual display 400 has a first display size $s_1$ and display unit 402 has a second display size $s_2$ smaller than the first display size (e.g., $s_2 < s_1$). Display unit 402 may be configured to present a view of personalized visual display 400. The view of personalized visual display 400 may be a portion of personalized visual display 400 visible in display unit 402.

In some implementations, display unit 402 includes a scroll bar 404. Scroll bar 404 may be used to adjust the view of personalized visual display 400 (e.g., by scrolling vertically, horizontally, etc.). Adjusting the view of personalized visual display 400 may control the portion of personalized visual display 400 that is visible in display unit 402. Personalized visual display 400 may be closed or minimized by clicking "x" 456.

Still referring to FIG. 4, personalized visual display 400 is shown to include multiple product images 412-426 and supplemental items 428-430 (collectively items 412-430). Product images 412-426 may be selected by product image selection module 142 and may feature products selected by product selection module 140. The products featured in product images 412-426 may be selected from a set of products associated with a particular content provider (e.g., the content provider associated with content item 302).

The products associated with product images 412-426 may be selected (e.g., by product selection module 140) according to product selection criteria. In some implementations, the product selection criteria includes criteria for selecting products that are estimated to be most likely to invoke a purchase, a conversion event, a commercial interaction, or other desirable interaction by the particular user or user device to which personalized visual display 400 is presented (e.g., based on an established click-through-rate, a predicted click-through-rate, etc.). In some implementations, the product selection criteria includes criteria for selecting products that are most relevant (e.g., products that are estimated to be most appealing, interesting, enticing, etc.) to the particular user or user device.

Supplemental items 428-434 are shown to include a map 428, descriptive text 430 and 432 and coupon 434. Map 428 may illustrate the location of a nearby store or other place of interest associated with personalized visual display 400 (e.g., a store through which the products featured in personalized visual display 400 may be purchased). Descriptive text 430 and 432 may be associated with product images 412 and 414, respectively. For example, descriptive text 430 may describe the product featured in product image 412 and descriptive text 432 may describe the product featured in product image 414. Coupon 434 may be a product coupon, special promotion, or sales offer applicable to some or all of the products featured in product images 412-426 (e.g., "15% off everything with promo code ABC"). Supplemental items may further include call to action text ("click here for more information," "buy now," etc.), store contact information (e.g., telephone numbers, website URL, email address, etc.), or other types of information supplementing the plurality of product images 412-426.

Still referring to FIG. 4, product images 412-426 are shown having various display sizes and display positions. The display sizes and/or display positions of images 412-426 may be personalized to a particular user or user device. For example, images featuring products estimated (e.g., by product selection module 140) to be most relevant or appealing to the particular user or user device may have a relatively larger display size and/or more prominent display position in personalized visual display 400 (e.g., top, middle, etc.). Conversely, images featuring products estimated to be relatively less relevant or appealing to the particular user or user device items may have a relatively smaller display size and/or a relatively less prominent display position in personalized visual display 400. As shown in FIG. 4, product image 412 and product image 414 have a larger display size than the remaining product images, indicating that the particular user or user device to which personalized visual display 400 is to be presented may be more likely to purchase the computer featured in product image 412 and the video camera featured in product image 414 than the products featured in the remaining product images 416-426.

In some implementations, items 412-434 are displayed as a mosaic. For example, items 412-434 may be presented as a collection of non-overlapping tiles or icons. In other implementations, items 412-434 may be displayed as overlapping tiles or icons (e.g., transparent or semi-transparent tiles or icons, overlaid tiles or icons, nested tiles or icons, etc.), as part of an electronic book or catalog (e.g., an interface having flippable "pages" on which items 412-434 are displayed), rendered as part of a user-interactive object (e.g., an interactive two-dimensional or three-dimensional object which may be manipulated or repositioned to view various items 412-434), or any other visual display format.

Items 412-434 may be displayed in a compact format (e.g., with little to no empty space between adjacent items), in a loosely arranged format (e.g., with substantial padding, borders, and/or empty space between items), or in a format having an intermediate display density. In some implementations, some or all of product images 412-426 include descriptive text identifying the featured products (e.g., "Camera," "Copier," "Scanner," etc.). In other implementations product images 412-426 do not include text identifying the featured products.

Figure 5:
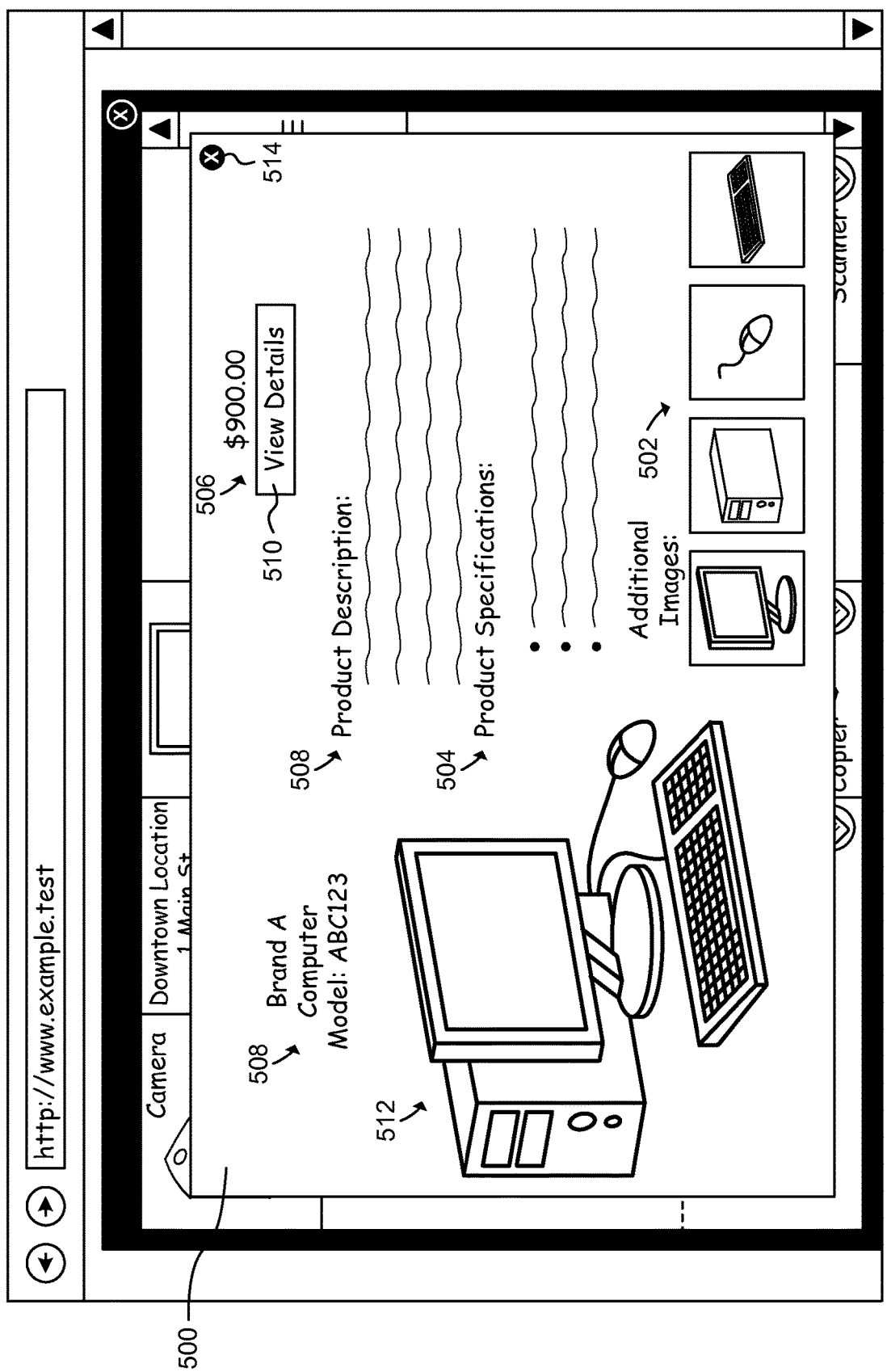
FIG. 5 is a drawing of a product details portion of the personalized visual display of FIG. 4, the product details portion including detailed product information for a product featured in the personalized visual display and which may be presented in response to an interaction with one of the product images in the personalized visual display, according to a described implementation.

Referring now to FIG. 5, a product details portion 500 of personalized visual display 400 is shown, according to a described implementation. Product details portion 500 may be displayed in response to an interaction with one of product images 412-426 (e.g., clicking on or hovering over the product image, etc.) in personalized visual display 400. In some implementations, product details portion 500 is a modal window, a pop-up window, a separate page or view, a window, or any other portion of personalized visual display 400.

Product details portion 500 is shown to include additional product images 502 product specifications 504, price 506, descriptive text 508, and product image 512. Product images 502 may include, for example, images of the product having various resolutions or image sizes (e.g., a high resolution image, a medium resolution image, a low resolution image, etc.), images of the product from different perspectives (e.g., a front perspective image, a rear perspective image, etc.), images of the product in different settings or uses, different versions of the product (e.g., different colors, different sizes, different model numbers, etc.), or other images of the product. Product specifications 504, price 506, and descriptive text 508 may provide additional details of the product (e.g., dimensions, weight, material composition, functionality, model number, etc.). Product image 512 may be the same as one of product images 412-426, a higher resolution version of one of product images 412-426, or an alternative image of the featured product.

Product details portion 500 may further include availability information, related products or services, product alternatives (e.g., alternative sizes, colors, models, versions, etc.), accessories, product features, purchasing information, or any other type of information relating to a product presented in personalized visual display 400. The specific types of product information included in product details portion 500 may vary based on the types of available or relevant information for particular products. For example, if the price of a particular product is unknown or unavailable, price 406 may be omitted or replaced with an indication that price information is unavailable. In some implementations, product details portion 500 may include additional product details supplementing or replacing the various types of product details listed here (e.g., based on the class of product and/or relevant information pertaining to the product).

Referring now to FIGS. 4 and 5 together, in some implementations, product images 412-426 include an embedded hyperlink. The embedded hyperlink may direct a user device to product details portion 500. Clicking on one of product images 412-426 in personalized visual display 400 may cause product details portion 500 to appear and/or present additional details relating to the product associated with the clicked image. For example, if a user clicks on product image 412, product details portion 500 may be displayed and may include product details relating to the computer featured in product image 412. If a different product image is clicked (e.g., product image 414), the information in product details portion 500 may be replaced with product details relating to the product featured in the different product image (e.g., product details relating to the video camera featured in product image 414).

In some implementations, product details portion 500 is closed or minimized (e.g., by clicking "x" 514) before a new product image is selected in personalized visual display 400. In other implementations, product details portion 500 may be displayed continuously while a user browses and selects various product images 412-426.

In some implementations, product images 412-426 include overlay icons 440-454. Overlay icons 450-454 are shown as a "tag" icon in FIG. 4. Overlay icons 440-454 may include an embedded hyperlink different than the embedded hyperlink associated with product images 412-426. For example, clicking one of product images 412-426 may cause additional details of the featured product to be presented via product details portion 500, whereas clicking overlay icons 440-454 may cause the user device to navigate to a separate resource through which the product can be purchased.

In other implementations, the embedded hyperlink links to a separate resource (e.g., other than product details portion 500). Clicking on one or product images 412-426 in personalized visual display 400 may cause user devices 108 to navigate to the separate resource. The separate resource may be, for example, a webpage owned or operated by content providers 106. The separate resource may include product details relating to the product featured in the clicked image and/or allow a user to purchase the featured product.

In some implementations, the product details are displayed exclusively on the separate resource. In other implementations, the product details are presented exclusively on product details portion 500. In further implementations, the product details may be presented on both product details portion 500 and the separate resource. In some implementations, product details portion 500 includes a link 510 to the separate resource. Clicking link 510 may cause the user device to navigate to a webpage or other resource through which additional product details may be displayed.

Figure 6:
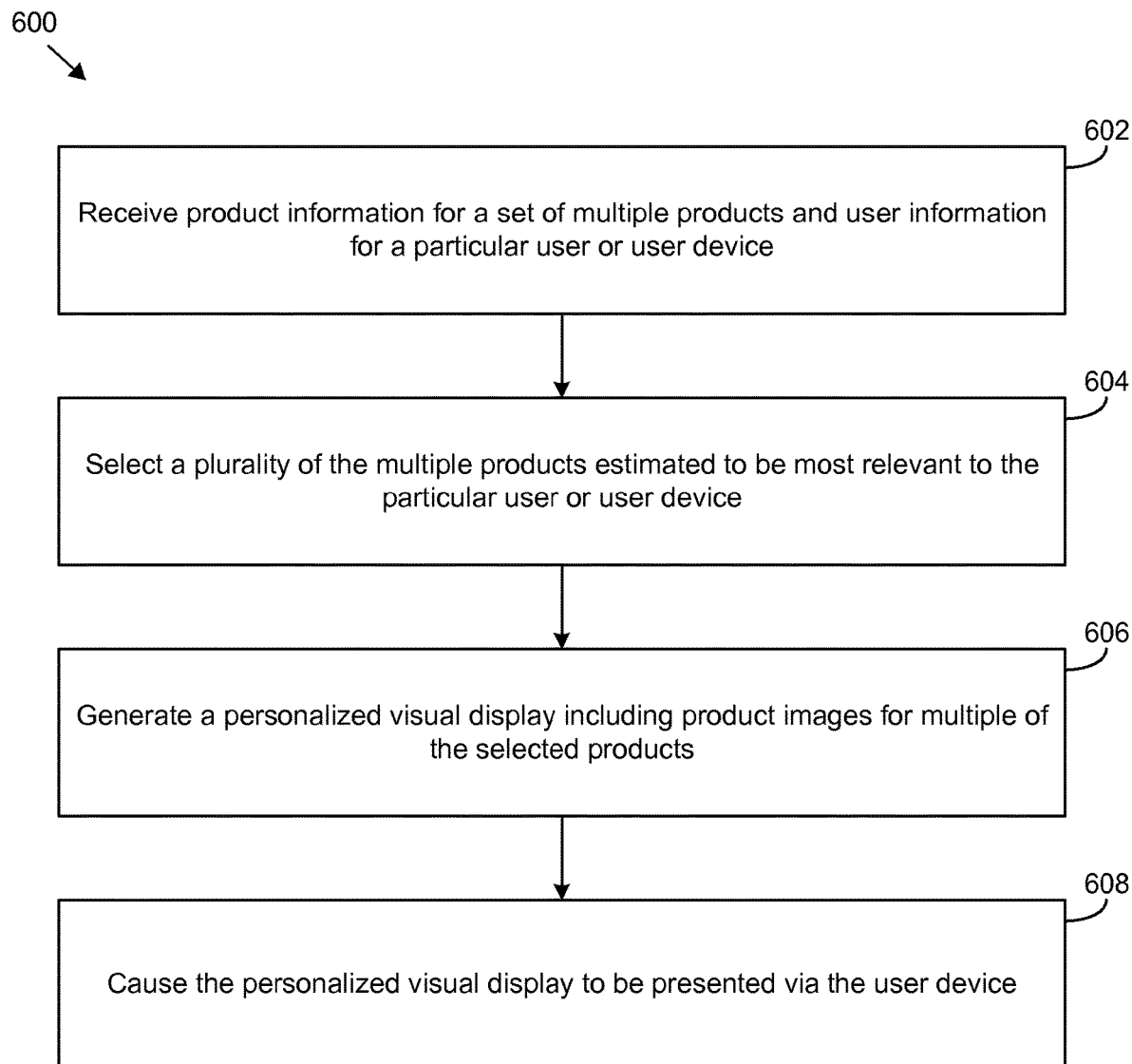
FIG. 6 is a flowchart of a process for providing a personalized visual display of multiple products, according to a described implementation.

Referring now to FIG. 6, a flowchart of a process 600 for generating a personalized visual display of multiple products is shown, according to a described implementation. Process 600 may be implemented using computer system 100. In some implementations, some or all of the steps of process 600 may be performed by content server 112 (e.g., using communications interface 120, processor 132, and memory modules 136-150).

Process 600 is shown to include receiving product information for a set of multiple products and user information for a particular user or user device (step 602). Product information may include, for example, product images (e.g., thumbnail images, low/medium/high resolution product images, alternative product images, etc.), product details (e.g., product specifications, price, availability, descriptive text, purchasing information, etc.), and/or other information associated with a set of multiple products. In some implementations, the set of multiple products may include only products associated with a single content provider.

User information may include, for example, user-specific information (e.g., user demographics, user preferences, user behavior data, etc.), contextual information (e.g., user location, web page context, recent page views, etc.), keyword information (e.g., keywords associated with a particular web page or search query, etc.), and/or other information which may be used by content server 112 to select products which are relevant or interesting to a particular user or user device (e.g., products which are most likely to invoke a purchase or conversion event).

In some implementations, step 602 includes storing the product information and/or user information in a data storage device. The product information and user information may be stored locally (e.g., within memory 134) or remotely (e.g., within data storage devices 110, etc.).

Still referring to FIG. 6, process 600 is shown to include selecting a plurality of the multiple products estimated to be most relevant to the particular user or user device (step 604). In some implementations, step 604 includes selecting a plurality of products from the set of multiple products according to product selection criteria. The product selection criteria may include criteria for selecting products that are most relevant to the particular user or user device. In some implementations, products that are most relevant to the particular user or user device include products that are estimated (e.g., by product selection module 140) to be most appealing, most attractive, most interesting, and/or most likely to invoke a purchase or conversion event from the particular user or user device. In some implementations, step 604 is performed by product selection module 140, as described with reference to FIG. 2.

In some implementations, step 604 includes identifying products that are most relevant to the particular user or user device. Such products may be identified using the product information for the set of multiple products and the user information for the particular user or user device. For example, in some implementations, products that are most relevant to a particular user or user device may be identified by comparing keywords associated with each of the products in the set of multiple products with keywords associated with the particular user or user device Keywords associated with each of the products in the set of multiple products may be specified by content providers 106, extracted from the product information, or otherwise identified using information associated with each of the multiple products. Keywords associated with the particular user or user device may be identified (e.g., generated, extracted, determined, etc.) using the user information.

In some implementations, step 604 includes selecting a subset of the multiple products in the set of multiple products. The subset may include less than all of the multiple products and may define a selection of the multiple products that will be included in the personalized visual display. For example, step 604 may include selecting a predetermined number of products (e.g., five products, ten products, fifty products, etc.). The predetermined number may be a static threshold, a dynamic threshold (e.g., based on the display sizes and/or available display space in the display unit), a user-adjustable threshold, or an automatically-adjusted threshold (e.g., based on a signal or parameter received from another memory module within memory 134 or from a separate device or system).

In some implementations, step 604 includes ranking some or all of the products in the set of multiple products. The ranking may define a priority for including each of the products in the personalized visual display. For example, the top ranking product may have the highest priority for inclusion in the personalized visual display whereas the lowest ranking product may have the lowest priority for inclusion in the personalized visual display. The product rankings may be based on a relevancy score or other score assigned to the various products in determining which of the products are most likely to appeal to the particular user or user device. In some implementations, step 604 includes selecting a predetermined number of the top ranking products. In some embodiments, step 604 includes storing the rankings for subsequent utilization.

Still referring to FIG. 6, process 600 is shown to include generating a personalized visual display including product images for multiple of the selected products (step 606). A plurality of the product images may be displayed concurrently in the personalized visual display. In some implementations, step 606 includes determining an arrangement for the personalized visual display. Step 606 may be performed by visual display generation module 148 and/or arrangement determination module 146 as described with reference to FIG. 2. In some implementations, step 606 is performed in response to an interaction between user devices 108 and a previously-delivered content item.

Determining an arrangement may include determining a display size and/or a display position for the selected images in the personalized visual display. In some implementations, step 606 includes personalizing the display sizes and/or display positions of the selected images to a particular user or user device. A larger display size or more prominent display position in the personalized visual display (e.g., top, middle, etc.) may be assigned to product images corresponding to products that are estimated to be more relevant or more appealing to the particular user to whom the personalized visual display will be presented. For example, if the personalized visual display will be presented to a user having a strong established interest in solid state hard drives, a product image of a solid state hard drive (if available in the set of products associated with the identified content provider) may be assigned a larger display size or more prominent display position than images of other products in the personalized visual display. Step 606 may include using product rankings and/or relevancy scores (e.g., rankings or scores which may have been assigned in step 604) to determine which of the plurality of product images and supplemental items to feature most prominently.

In some implementations, step 606 includes determining an arrangement that fills the display space available in a display unit (e.g., if the personalized visual display is presented in a fixed-size display unit). Step 606 may include resizing, cropping, adding a border or padding, stretching, shrinking, or otherwise adjusting one or more of the plurality of product images to achieve a particular display size. In other implementations, step 606 involves determining an arrangement without considering horizontal space limitations or vertical space limitations. For example, the personalized visual display may be scrolled (e.g., vertically, horizontally, etc.) to allow any number of product images to be presented, regardless of the display size of the display unit. Step 606 may include generating an arrangement that uses some or all of the product images selected by product image selection module 142.

In some implementations, step 606 the personalized visual display includes one or more supplemental items. The supplemental items may include, for example, descriptive text (e.g., text describing one or more of the product images selected by product image selection module 142), call to action text ("click here for more information," "buy now," etc.), information relating to special promotions or sales offers (e.g., "15% off everything with promo code ABC"), product coupons, store location information (e.g., a map illustrating the location of a nearby store), store contact information (e.g., telephone numbers, website URL, email address, etc.), or other types of information supplementing the plurality of product images. The supplemental items may be included in the personalized visual display along with the plurality of product images. Step 606 may include generating an arrangement that uses one or more of the supplemental items selected by supplemental item selection module 144.

In some implementations, step 606 includes rendering the personalized visual display. In some implementations, step 606 includes generating display data (e.g., rendering instructions) for transmission to user devices 108. User devices 108 may then render the personalized visual display using the display data generated in step 606. An example of a personalized visual display which may be generated in step 606 (e.g., personalized visual display 400) is described in greater detail with reference to FIG. 4.

Still referring to FIG. 6, process 600 is shown to include causing the personalized visual display to be presented via the user device (step 608). In some implementations, step 608 includes sending display data to the user device. The user device may render the display data to generate the personalized visual display. The personalized visual display may be presented in any type of display format including web pages (e.g., HTML web pages, PHP web pages, etc.), word processing documents, portable document format (PDF) documents, images, video, programming elements, interactive content, streaming video/audio sources, or other types of electronic information.

In some implementations, the personalized visual display is presented in a browser window (e.g., browser window 300). The personalized visual display may be presented in the same window used to present the previously-delivered content item, in a modal window overlay, in a separate window or tab, or any other display location.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system to reduce network requests via delivery of combined data packages, comprising:

a communications interface of a server configured to receive, via a network, a first data feed including a first plurality of data objects from a first content provider and a second data feed including a second plurality of data objects from a second content provider, the first plurality of data objects included in the first data feed defined by the first content provider, each of the first plurality of data objects comprising an image;

an interaction detection component, a selection component, and an arrangement determination component executed by one or more processing circuits of the server to cause the server to:

detect an interaction with a content item object displayed, in a frame on a first webpage, on a display device of a computing device remote from the server, the content item object selected for display in accordance with a content selection policy defined by the first content provider;

responsive to the detection of the interaction:

identify the first data feed received from the first content provider;

select, from the first plurality of data objects corresponding to the first content provider, a subset of data objects from the first plurality of data objects using a list of second webpages previously accessed via the computing device;

rank each data object of the subset of data objects based on the list of second webpages previously accessed via the computing device;

determine, based on the rank of each data object of the subset of data objects, a size and a position for the image included in each data object of the subset of data objects;

construct an interactive customized graphical user interface element for the subset of data objects selected using the list of second webpages previously accessed via the computing device, the interactive customized graphical user interface element configured to display the image included in each data object of the subset of data objects at the size and the position of the image;

transmit, to the computing device via the network, instructions to present the interactive customized graphical user interface element, the interactive customized graphical user interface element configured to cause, responsive to detection of a second interaction by the computing device with a rendered data object of the subset of data objects displayed within the interactive customized graphical user interface element, the computing device to display an additional data object item corresponding to the rendered data object.

2. The system of claim 1, wherein the server is configured to:

receive a request for content prior to detection of the interaction with the content item object; and provide the content item object responsive to the request.

3. The system of claim 1, wherein the server is configured to receive a notification of the interaction, the interaction comprising a hover or a selection detected by an agent executed by the computing device.

4. The system of claim 1, wherein the server is configured to:

rank each data object of the subset of data objects using computing device-specific information; and construct the interactive customized graphical user interface element for the subset of data objects using the computing device-specific information and the rank of each of the subset of data objects.

5. The system of claim 1, wherein the server is configured to:

determine an arrangement of the subset of data objects that includes modifying at least one of the subset of data objects by at least one of resizing, cropping, adding a border, padding, stretching, or shrinking the at least one of the subset of data objects.

6. The system of claim 1, wherein the server is configured to:

determine an arrangement for the interactive customized graphical user interface element based on a first image included in a first data object of the subset of data objects having a first size greater than a second size of a second image included in a second data object of the subset of data objects;

construct the interactive customized graphical user interface element according to the determined arrangement;

identify arrangement criteria comprising criteria for arranging the first image included in the first data object and the second image of the second data object based on object information and computing device-specific information; and determine the arrangement according to the identified arrangement criteria.

7. The system of claim 1, wherein the server is configured to provide a modal window for the additional data object item in response to the detection of the second interaction.

8. The system of claim 1, wherein the server is configured to provide a map with the interactive customized graphical user interface element.

9. A method of reducing network requests via delivery of combined data packages, comprising:

receiving, by a communications interface of a server via a network, a first data feed including a first plurality of data objects from a first content provider and a second data feed including a second plurality of data objects from a second content provider, the first plurality of data objects included in the first data feed defined by the first content provider, each of the first plurality of data objects comprising an image;

detecting, by an interaction detection component executed by one or more processing circuits of the server, an interaction with a content item object displayed, in a frame on a webpage, on a display device of a computing device remote from the server, the content item object selected for display in accordance with a content selection policy defined by the first content provider;

responsive to detecting the interaction:
identifying, by a selection component executed by the server, the first data feed received from the first content provider;

selecting, by the selection component executed by the server, a subset of data objects from the first plurality of data objects using a list of second webpages previously accessed via the computing device;

ranking, by the selection component executed by the server, each data object of the subset of data objects based on the list of second webpages previously accessed via the computing device;

determining, by the selection component executed by the server, based on the ranking of each data object of the subset of data objects, a size and a position for each image included in each data object of the subset of data objects;

constructing, by the server, an interactive customized graphical user interface element for the subset of data objects selected using the list of second webpages previously accessed via the computing device, the interactive customized graphical user interface element configured to display the image included in each data object of the subset of data objects at the size and the position of the image;

transmitting, by the server to the computing device via the network, instructions to present the interactive customized graphical user interface element, the interactive customized graphical user interface element configured to cause, responsive to detection of a second interaction by the computing device with a rendered data object of the subset of data objects displayed within the interactive customized graphical user interface element, the computing device to display an additional data object item corresponding to the rendered data object.

10. The method of claim 9, comprising:
receiving a request for content prior to detection of the interaction with the content item object; and
providing the content item object responsive to the request.

11. The method of claim 9, comprising receiving a notification of the interaction, the interaction comprising a hover or a selection detected by an agent executed by the computing device.

12. The method of claim 9, comprising:
ranking each data object of the subset of data objects using computing device-specific information; and
constructing the interactive customized graphical user interface element for the subset of data objects using the computing device-specific information and the rank of each of the subset of data objects.

13. The method of claim 9, comprising determining an arrangement of the subset of data objects that includes modifying at least one of the subset of data objects by at least one of resizing, cropping, adding a border, padding, stretching, or shrinking the at least one of the subset of data objects.

14. The method of claim 9, comprising:
determining an arrangement for the interactive customized graphical user interface element based on a first image included in a first data object of the subset of data objects having a first size greater than a second size of a second image included in a second data object of the subset of data objects;
construct the interactive customized graphical user interface element according to the determined arrangement;
identifying arrangement criteria comprising criteria for arranging the first image included in the first data object and the second image of the second data object based on object information and computing device-specific information; and
determining the arrangement according to the identified arrangement criteria.

15. The method of claim 9, comprising providing a modal window for the additional data object item in response to the detection of the second interaction.

16. The method of claim 9, comprising providing a map with the interactive customized graphical user interface element.

17. The system of claim 1, wherein the server is further configured to:
receive a hover interaction with a first data object of the subset of data objects displayed by the interactive customized graphical user interface element; and
cause, responsive to the hover interaction, the computing device to display the additional data object item corresponding to the first data object.

18. The method of claim 9, further comprising:
receiving, by the server, a hover interaction with a first data object of the subset of data objects displayed by the interactive customized graphical user interface element; and
causing, by the server, responsive to the hover interaction, the computing device to display the additional data object item corresponding to the first data object.

* * * * *